United States Patent
Li et al.

(10) Patent No.: US 11,994,476 B2
(45) Date of Patent: May 28, 2024

(54) MULTI-COLOR SURFACE INSPECTION SYSTEM, METHOD FOR INSPECTING A SURFACE, AND METHOD FOR CALIBRATING THE MULTI-COLOR SURFACE INSPECTION SYSTEM

(71) Applicant: Carl Zeiss Industrielle Messtechnik GmbH, Oberkochen (DE)

(72) Inventors: Ming Li, Maple Grove, MN (US); Drew Schiltz, Maple Grove, MN (US)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 100 days.

(21) Appl. No.: 17/212,994

(22) Filed: Mar. 25, 2021

(65) Prior Publication Data

US 2021/0215618 A1    Jul. 15, 2021

Related U.S. Application Data

(63) Continuation of application No. PCT/US2018/052749, filed on Sep. 25, 2018.

(51) Int. Cl.
| | |
|---|---|
| *G01N 21/88* | (2006.01) |
| *G01N 21/25* | (2006.01) |
| *G01N 21/27* | (2006.01) |
| *H04N 23/12* | (2023.01) |

(52) U.S. Cl.
CPC ......... *G01N 21/8851* (2013.01); *G01N 21/25* (2013.01); *G01N 21/274* (2013.01); *H04N 23/12* (2023.01); *G01N 2201/0627* (2013.01)

(58) Field of Classification Search
None
See application file for complete search history.

(56) References Cited

U.S. PATENT DOCUMENTS

| 3,971,065 A | 7/1976 | Bayer |
|---|---|---|
| 11,110,611 B2 | 9/2021 | Häusler |

(Continued)

FOREIGN PATENT DOCUMENTS

WO    2017081029 A2    5/2017

OTHER PUBLICATIONS

Peisen S. Huang "Color-encoded digital fringe projection technique for high-speed three-dimensional surface contouring", Optical Engineering, vol. 38, No. 6, Jun. 1, 1999 (Jun. 1, 1999), p. 1065, XP055192076, ISSN: 0091-3286, DOI: 10.1117/1.602151.

(Continued)

*Primary Examiner* — Rebecca A Volentine
(74) *Attorney, Agent, or Firm* — Ewers IP Law PLLC; Falk Ewers

(57) ABSTRACT

A multi-color system for optically inspecting a surface of a specimen includes a multi-wavelength led array to illuminate the specimen with a multi-color light pattern including simultaneously emitted spatial intensity color image patterns, each of which has first areas in which light is emitted with a first light intensity and second areas in which the light is emitted with a second light intensity, the first light intensity being higher than the second light intensity, and corresponding first and second areas in each of the simultaneously emitted spatial intensity color image patterns being phase-shifted relative to each other. A multi-color sensor captures each of the simultaneously emitted spatial intensity color image patterns reflected from the surface of the specimen in a single wavelength-multiplexed sensor image, and a data processing apparatus in communication with the multi-color sensor determines properties of the surface based on an evaluation of the single wavelength-multiplexed sensor image.

15 Claims, 14 Drawing Sheets

(56) References Cited

U.S. PATENT DOCUMENTS

| | | |
|---|---|---|
| 2005/0088529 A1 | 4/2005 | Geng |
| 2005/0152146 A1 | 7/2005 | Owen et al. |
| 2008/0080180 A1* | 4/2008 | Messina ............ G01N 21/8806 362/311.06 |
| 2010/0091272 A1* | 4/2010 | Asada .................... G01N 21/55 356/237.2 |
| 2011/0181873 A1* | 7/2011 | Yavets-Chen ......... G01N 21/55 356/237.2 |
| 2011/0262007 A1* | 10/2011 | Kojima .................. G06T 7/586 382/103 |
| 2017/0227471 A1 | 8/2017 | Cilip et al. |
| 2019/0265681 A1* | 8/2019 | Horie ..................... H04N 7/181 |
| 2020/0025687 A1* | 1/2020 | Mazeaud ........... G01N 21/8806 |
| 2020/0191714 A1* | 6/2020 | Wissmann ............. G01N 21/41 |
| 2021/0183085 A1* | 6/2021 | Pau ........................ G06T 7/521 |

OTHER PUBLICATIONS

Chen L C et al "Dynamic 3D surface profilometry using a novel colour pattern encoded with a multiple triangular model". Measurement Science and Technology, IOP, Bristol, GB, vol. 21, No. 5, May 1, 2010 (May 1, 2010), p. 54009, XP020174508, ISSN: 0957-0233.

Jorge L. Flores et al "Color deflectometry for phase retrieval using phase-shifting methods", Optics Communications, vol. 334, Jan. 1, 2015 (Jan. 1, 2015), pp. 298-302, XP055587540, Amsterdam, NL ISSN: 0030-4018, DOI: 10.1016/j.optcom.2014.08.030.

Trumper Isaac et al: "Instantaneous phase mapping deflectometry for dynamic deformable mirror characterization", Proceedings of SPIE; [Proceedings of SPIE ISSN 0277-786X vol. 10524], SPIE, US, vol. 10401, Sep. 5, 2017 (Sep. 5, 2017), pp. 104010S-104010S, XP060095252, DOI: 10.1117/12.2272188 ISBN: 978-1-5106-1533-5.

International Preliminary Report on Patentability in PCT/US2018/052749 (from which this application claims priority) dated May 20, 2019.

International Search Report on Patentability in PCT/US2018/052749 (from which this application claims priority) dated May 20, 2019.

* cited by examiner

MULTI-COLOR SURFACE INSPECTION SYSTEM, METHOD FOR INSPECTING A SURFACE, AND METHOD FOR CALIBRATING THE MULTI-COLOR SURFACE INSPECTION SYSTEM

CROSS REFERENCE TO RELATED APPLICATIONS

This application is a continuation application of international patent application PCT/US2018/052749, filed Sep. 25, 2018, designating the United States, and the entire content of the application is incorporated herein by reference.

TECHNICAL FIELD

The invention relates to a system and a method for optically inspecting a surface of a specimen, and in particular to a multi-color surface inspection system, a method for multi-color inspection of a surface of a specimen, and a method for calibrating the multi-color surface inspection system.

BACKGROUND

White light surface inspection systems have been developed for high throughput and highly automated manufacturing of products with decorative and technical surfaces. These systems facilitate a high degree of sensitivity to even the smallest changes in form and gloss level on a myriad of types of surfaces and finishes.

A conventional phase-shifted deflectometry setup 100 is shown in FIG. 1. The setup includes a surface 110 of an object under test, a pattern area 120 generated by an illumination unit (not shown), a camera 130, and an image evaluation unit 140 with a display. The camera 130 sequentially takes a plurality of images of the reflected pattern area, which are subsequently evaluated by the image evaluation unit 140.

The phase-shifted deflectometry setup shown in FIG. 1 requires the illumination unit, the camera, and the surface of the object under test to be in a fixed spatial location to each other while the plurality of images is taken by the camera.

A conventional device for optically inspecting a surface of a sample to determine quality parameters of a product and to identify surface defects based on white light phase-shifted deflectometry is described, e.g., in U.S. Patent Application Publication No. 2017/0227471. The device includes a screen which provides profile patterns with areas that form spatial light intensity profiles and a curved mirror arranged between the screen and a holder for providing a second light profile pattern. Like the setup shown in FIG. 1, the device described in U.S. Patent Application Publication No. 2017/0227471 requires an image recording unit to record a plurality of images to determine properties of the surface of the sample.

The white light technique fails when spatial location of the surface to inspect cannot be held fixed with the illumination source and the camera over the time period required for multiple image acquisition, because there is a significant amount of time between each camera acquisition, typically in the order of tens of milliseconds for common cameras.

Such is particularly the case for inspection of painted auto body surfaces, where the surface to be inspected is an entire auto body moving down a production line on a conveyance system.

These conveyance systems, however, have unstable velocity such that multiple acquisitions from the camera will show significant variation in orientation from image to image. Thus, a system is needed which does not depend on a fixed relationship between the illumination source, the camera, and the surface to be inspected.

SUMMARY

It is therefore an object of the present invention to provide a system and a method, which does not require a fixed relationship between the illumination source, the camera, and the surface to be inspected. The object is achieved by a multi-color system for optically inspecting a surface of a specimen, wherein the system includes a multi-wavelength light-emitting diode (LED) array configured to illuminate the specimen with a multi-color light pattern, the multi-color light pattern including simultaneously emitted spatial intensity color image patterns, each of the simultaneously emitted spatial intensity color image patterns including first areas in which light is emitted with a first light intensity and second areas in which the light is emitted with a second light intensity, the first light intensity being higher than the second light intensity, and corresponding first and second areas in each of the simultaneously emitted spatial intensity color image patterns being phase-shifted relative to each other, a multi-color sensor configured to capture each of the simultaneously emitted spatial intensity color image patterns reflected from the surface of the specimen in a single wavelength-multiplexed sensor image at a scanning position, and a data processing apparatus in communication with the multi-color sensor and configured to determine properties of the surface based on an evaluation of the single wavelength-multiplexed sensor image.

The multi-color technology that is utilized in the multi-color system relies on phase-shifted deflectometry. Similar to the white light sensor technology, the multi-color technique of phase-shifted deflectometry requires three components: (1) the surface of an object to be inspected is at least partially glossy, (2) the specimen is illuminated with a spatial intensity light pattern, and (3) a camera or light sensor captures the spatial light intensity pattern reflected or scattered from the surface of the object to be inspected.

In the case of white light sensor technology, three or more acquisitions are taken from the spatial intensity light pattern by the camera. The only difference between each acquisition is the illumination condition. For example, if the spatial light intensity pattern is a sinusoidal light intensity pattern, the sinusoidal pattern shifts by $n*2\Gamma/n_{tot}$, where n is the $n^{th}$ acquisition and $n_{tot}$ is the total number of acquisitions in the sequence.

After the three or more acquisitions are taken, post-calculated images can then be generated, including images for main grayscale, phase, and amplitude channels. The grayscale channel represents an average light intensity of the three images. The amplitude channel carries information about changes in gloss on the surface. The phase is directly comparable to the slope of the surface of the object. Fully utilizing all of the information from these post-calculated image sets, algorithms are then developed to find irregularities based on scattering qualities of an anomaly or physical changes in depth on the surface. Sensitivity to sub-micron depth on the surface is common-place, making such a system ideal for inspection of defects such as dents, bumps, scratches, waviness, or orange peel to name a few.

However, a main difference between the white light sensor technology and the multi-color technology is that, as discussed above, the white light sensor technology requires taking multiple separate camera image acquisitions while shifting the light pattern, whereas the multi-color sensor requires taking only one single acquisition which includes a plurality of phase-shifted illumination conditions within a plurality of different visible wavelength regimes. Herein, the plurality of different visible wavelength regimes can be thought of as a wavelength multiplexed scheme.

According to an aspect of the invention, the multi-color sensor is configured to capture the single wavelength-multiplexed sensor image while the specimen is moving. The multi-color sensor can be a multi-sensor prism color camera.

According to another aspect of the invention, the multi-color system includes a robot arranged at the scanning position, the robot having a robot arm, and the multi-color sensor being mounted on the robot arm.

According to yet another aspect of the invention, each of the simultaneously emitted spatial intensity color image patterns has a different wavelength regime and forms a wavelength channel, and bandwidths of the wavelengths channels do not overlap. In addition, each of the simultaneously emitted spatial intensity color image patterns is a sinusoidal color light intensity pattern.

According to a further aspect of the invention, the multi-color system includes a LED driver in communication with the multi-wavelength LED array, the multi-wavelength LED array includes a plurality of LEDs, the plurality of LEDs is arranged in groups of LEDs, and each of the groups of LEDs is controlled by the LED driver to generate one of the simultaneously emitted spatial intensity color image patterns.

The plurality of LEDs forming the multi-wavelength LED array are arranged on an LED board, a heat sink is arranged on one side of the LED board, an optical diffuser is arranged on another side of the LED board, and the LED driver is configured to control each of the plurality of LEDs individually. The multi-wavelength LED array may include a plurality of LED boards. Each LED board may contain 1024 LEDs and multiple boards can be aligned together to create large illumination units.

A first group of the LEDs has a red wavelength regime, a second group of the LEDs has a green wavelength regime, and a third group of the LEDs has a blue wavelength regime, and the first, second, and third groups of the LEDs are arranged on the LED board in a Bayer pattern, wherein approximately 50% of the LEDs are of a first group type, 25% of the LEDs are of a second group type, and 25% of the LEDs are of a third group type according to U.S. Pat. No. 3,971,065. The LED driver can be a field-programmable gate array (FPGA).

The object is further achieved by a method for multi-color inspection of a surface of a specimen, the method including: illuminating the specimen with a multi-color light pattern, the multi-color light pattern including simultaneously emitted spatial intensity color image patterns, each of the simultaneously emitted spatial intensity color image patterns including first areas in which light is emitted with a first light intensity and second areas in which the light is emitted with a second light intensity, the first light intensity being higher than the second light intensity, and corresponding first and second areas in each of the simultaneously emitted spatial intensity color image patterns being phase-shifted relative to each other, capturing each of the simultaneously emitted spatial intensity color image patterns reflected from the surface of the specimen in a single wavelength-multiplexed sensor image at a scanning position, and determining properties of the surface based on an evaluation of the single wavelength-multiplexed sensor image.

According to an aspect of the invention, the method further includes capturing the single wavelength-multiplexed sensor image as the specimen is moving. It is also possible that both the multi-color sensor and specimen are moving. Each of the simultaneously emitted spatial intensity color image patterns has a different wavelength regime and forms a wavelength channel, and bandwidths of the wavelengths channels do not overlap.

According to another aspect of the invention, each of the simultaneously emitted spatial intensity color image patterns is a sinusoidal color light intensity pattern, the specimen is illuminated by a multi-wavelength LED array, the simultaneously emitted spatial intensity color image patterns reflected from the surface of the specimen are captured by a multi-color sensor, and the multi-color sensor is a multi-color prism color camera.

According to yet another aspect of the invention, the multi-color sensor is mounted on a robot arm of a robot arranged at the scanning position. The scanning position can be a first scanning position, wherein the method includes defining an inspection cell, the inspection cell including a start position, the first scanning position, at least one second scanning position, and an end position, moving the specimen from the start position to the first scanning position, from the first scanning position to the at least one second scanning position, and from the at least one second scanning position to the end position, and capturing single images of the light intensity pattern reflected from the surface of the specimen at each of the first and the at least one second scanning positions.

According to a further aspect of the invention, the multi-wavelength LED array includes a plurality of LEDs, and the method further includes controlling each of the plurality of LEDs individually, arranging the plurality of LEDs in groups of LEDs, and controlling each of the groups of LEDs to generate one of the simultaneously emitted spatial intensity color image patterns.

The method according to yet another aspect of the invention includes arranging a first group of the LEDs, a second group of the LEDs, and a third group of the LEDs on an LED board in a Bayer pattern, the first group of the LEDs having a red wavelength regime, the second group of the LEDs having a green wavelength regime, and the third group of the LEDs having a blue wavelength regime.

According to a further aspect of the invention, the object is achieved by providing a method for calibrating the multi-color surface inspection system, the method including: illuminating the specimen with a uniform multi-color light pattern, the uniform multi-color light pattern including the simultaneously emitted spatial intensity color image patterns, and corresponding areas of each of the simultaneously emitted spatial intensity color image patterns having a same light intensity, capturing each of the simultaneously emitted uniform image patterns reflected from the surface of the specimen by the multi-color sensor in a single calibration sensor image at a calibration scanning position, subdividing the single calibration sensor image into pixels, determining whether light intensities of corresponding pixels of each wavelength channel in the single calibration sensor image reach a same intensity distribution, upon determining that the light intensities of the corresponding pixels of the wavelength channels in the single calibration sensor image reach a different intensity distribution, adjusting the light intensities of the corresponding areas of each of the simultaneously emitted spatial intensity color image patterns to permit the light intensities of corresponding pixels of each wavelength channel in the single calibration sensor image reach the same intensity distribution.

BRIEF DESCRIPTION OF THE DRAWINGS

The invention will now be described with reference to the drawings wherein.

DESCRIPTION OF EXEMPLARY EMBODIMENTS

Figure 1:
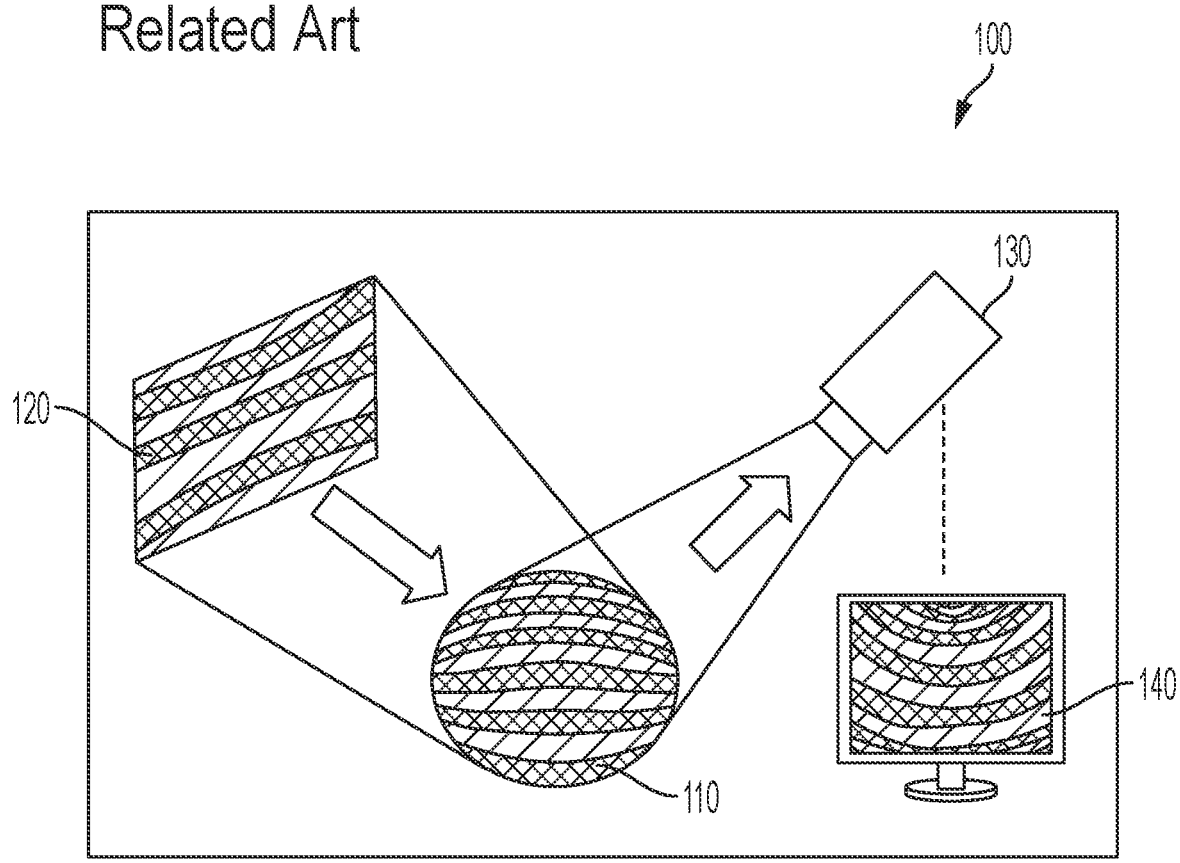
FIG. 1 shows a schematic illustration of a conventional phase-shifted deflectometry setup.
Figure 2:
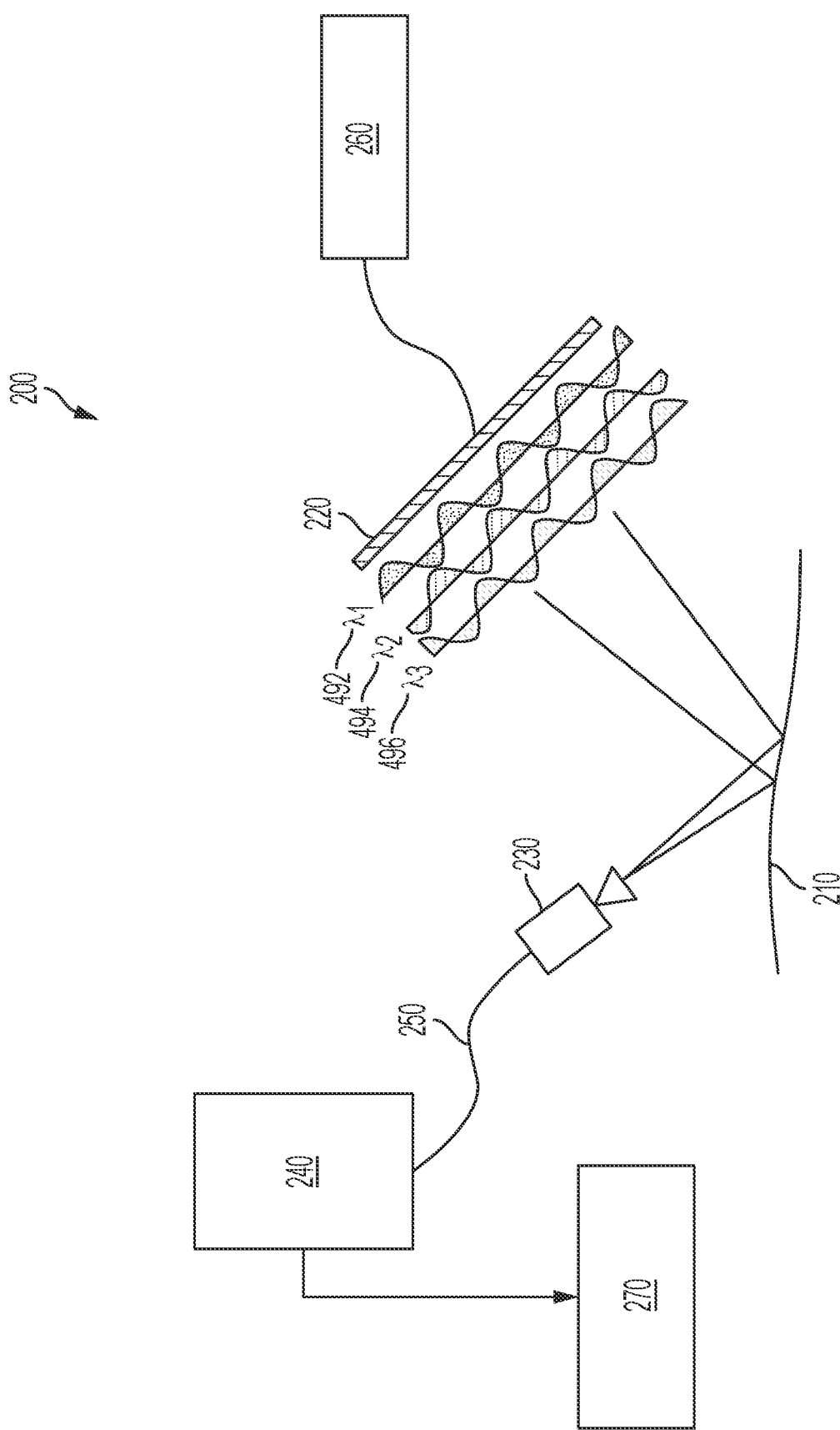
FIG. 2 shows a schematic illustration of a multi-color system for optically inspecting a surface of a specimen according to an exemplary embodiment of the invention.

FIG. 2 shows a schematic illustration of a multi-color system 200 for optically inspecting a surface 210 of a specimen. The multi-color system 200 includes a multi-wavelength LED array 220, a multi-color sensor 230, and a computer for data processing apparatus 240 in communication with the multi-color sensor 230 via a communication link 250. The multi-wavelength LED array 220 includes a plurality of LEDs and is controlled by an LED driver 260.

As shown in FIG. 2, the multi-wavelength LED array 220 is configured to emit a unique spatial light intensity pattern for separate wavelength regimes that is reflected by the surface 210, and that is captured by the multi-color sensor 230 and transmitted via the communication link 250 to the data processing apparatus 240. The data processing apparatus 240 generates data 270 representing a numerical surface characterization of gloss level and form of the surface 210.

Figure 3:
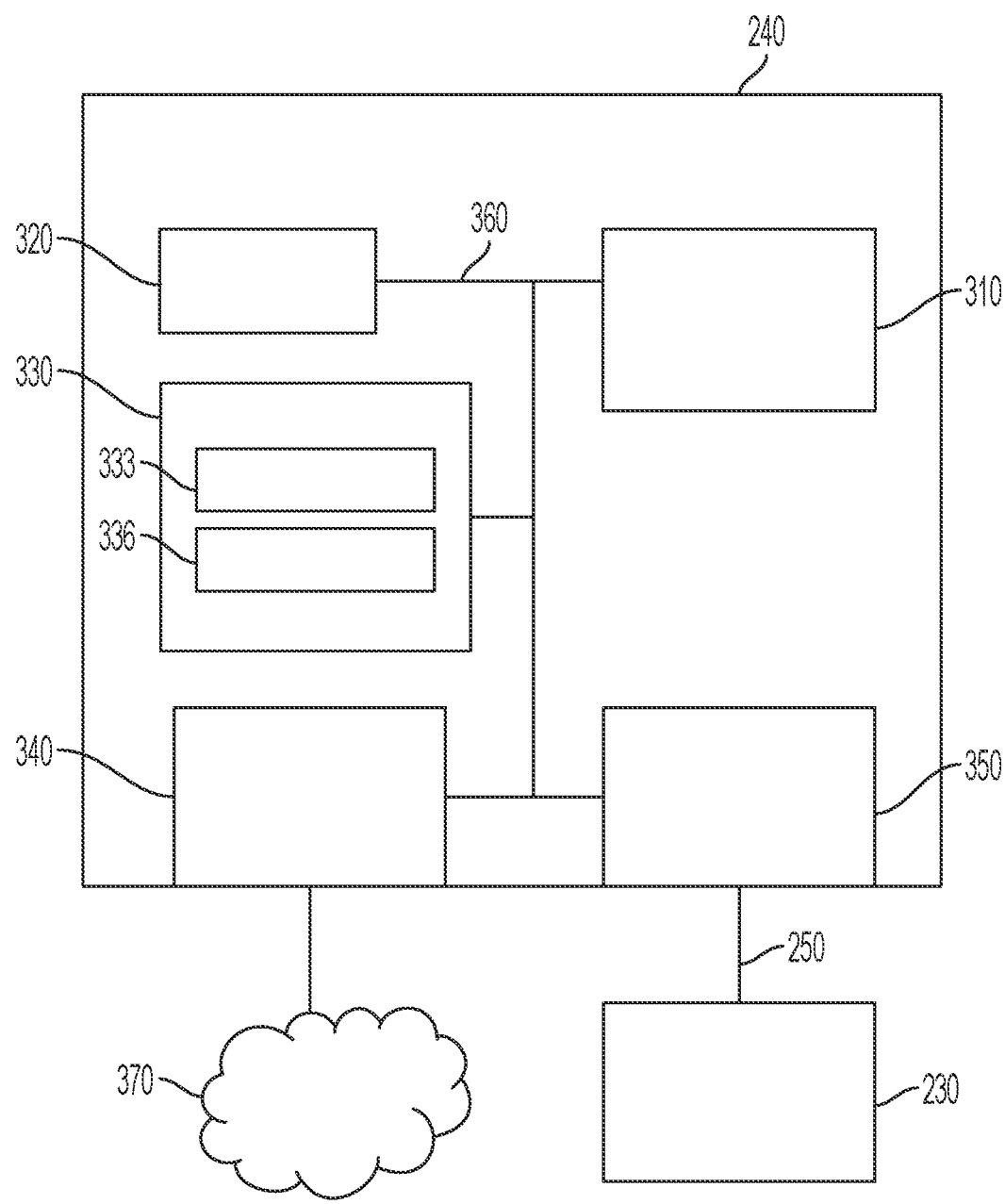
FIG. 3 shows a schematic illustration of a data processing apparatus according to an exemplary embodiment of the invention.

FIG. 3 shows a schematic illustration of a data processing apparatus 240. Data processing apparatus 240 may be implemented by any conventional or other computer systems optionally equipped with a display or monitor 310, at least one processor 320, at least one memory 330 and/or at least one internal or external network interface 340 (e.g., modem, network cards, etc.) and at least one communication interface 350, optional an input device (e.g., a keyboard, mouse, or other input device), and any commercially available or custom software. Display or monitor 310, the at least one processor 320, the at least one memory 330, the at least one internal or external network interface 340, and the at least one communication interface 350 are connected with each other via a data bus 360.

Memory 330 comprises a program logic module 333, which is configured to store a program logic, and a data section module 336, which is configured to store data, e.g., image data and numerical surface characterization data 270. Communication interface 350 is configured to communicate with multi-color sensor 230 via communication link 250 to receive the single wavelength-multiplexed sensor image captured by the multi-color sensor 230. The single wavelength-multiplexed sensor image is stored in the data section module 336 in memory 330.

Program logic module 333 comprises a program logic that includes instructions executed by the at least one processor 320. The memory 330 comprises a computer readable storage medium that may be non-transitory, and, may be, but is not limited to, an electronic storage device, a magnetic storage device, an optical storage device, an electromagnetic storage device, a semiconductor storage device, or any suitable combination of the foregoing, including a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and a memory stick.

Program logic includes further instructions to determine properties of the surface including numerical surface characterizations of gloss level and form. The properties are determined based on intensity, phase, and amplitude (intensity, phase, and amplitude channels). The amplitude channel carries information about changes in gloss on the surface. The phase is directly comparable to the slope of the surface of the object.

The processor 320 provides numerical surface characterization data 270 that can be displayed on a display 310 or can be forwarded through network interface 340 and network 370 to a main production control system (not shown), etc.

Figure 4A:
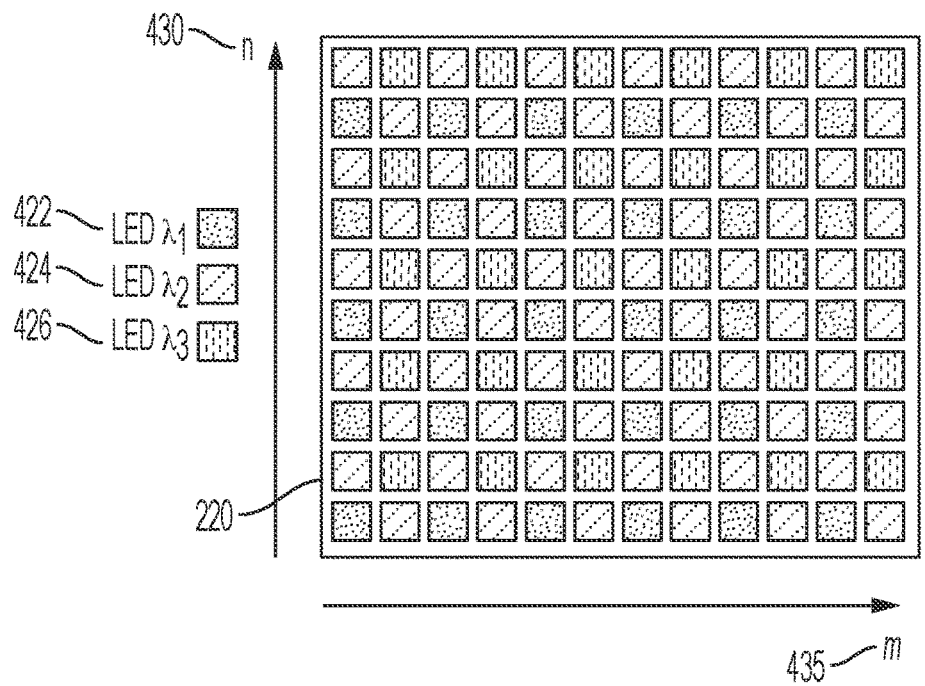
FIG. 4A shows a top view of a multi-wavelength LED array according to an exemplary embodiment of the invention.

FIG. 4A shows a top view of a multi-wavelength LED array 220 being part of a multi-color system according to an exemplary embodiment of the invention. As shown in FIG. 4A, the multi-wavelength LED array includes a plurality of LEDs arranged in groups of LEDs. A first group of the LEDs 422 has a red wavelength regime, a second group of LEDs 424 has a green wavelength regime, and a fourth group of LEDs 426 has a blue wavelength regime, and the first, second, and third groups of the LEDs are arranged in a Bayer pattern. However, the wavelength regimes are not limited to red, green, and blue. Instead, the selected wavelength regimes can be outside of the visible spectrum (i.e., infrared spectrum or ultraviolet (UV) spectrum) as long as the response of the surface to the different wavelengths is similar. Furthermore, it would be feasible to utilize any number of wavelength regimes, as long as the multi-color sensor is capable of detecting the different wavelengths.

Figure 4B:
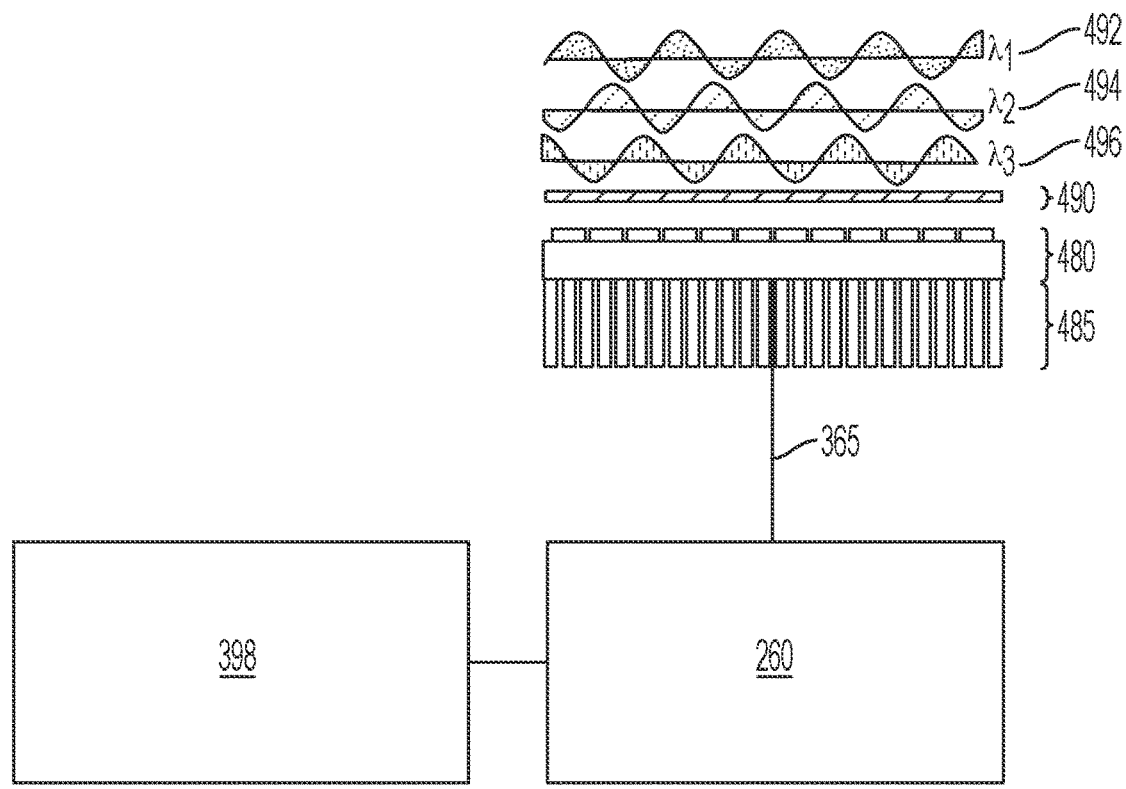
FIG. 4B shows a side view of the multi-wavelength LED array shown in FIG. 4A.

FIG. 4B shows a side view of the multi-wavelength LED array 220 shown in FIG. 4A. As shown in FIG. 4B, a LED driver 260 in communication with the multi-wavelength LED array 220 via communication link 365 is provided. Each of the first, second, and third groups of the LEDs is controlled by the LED driver 260 to generate one of the simultaneously emitted spatial intensity color image patterns. The first group of the LEDs 422 is controlled to generate spatial intensity color image pattern 492, the second group of LEDs 424 is controlled to generate spatial intensity color image pattern 494, and the third group of LEDs 426 is controlled to generate spatial intensity color image pattern 496. Each of the simultaneously emitted spatial intensity color image patterns has a different wavelength regime (e.g., red, green, and blue) and forms a wavelength channel.

The LED driver 260 can be implemented as a field-programmable gate array (FPGA), utilizes steady state current control, and is configured to control each of the plurality of LEDs of the multi-wavelength LED array 220 individually. A computer 398, as shown in FIG. 4B, may be connected to the LED driver 260 to enhance control functionalities.

The multi-wavelength LED array 220 includes LED board 480, on which the plurality of LEDs forming the multi-wavelength LED array 220 is arranged. A heat sink 485 is arranged on one side of the LED board 480 and an optical diffuser 490 is arranged on the other side of the LED board.

The multi-color sensor 230 may be a Bayer color camera or a multi-sensor prism color camera. The multi-color system 200 may further include a robot (not shown) arranged at the scanning position or a plurality of robots arranged at a plurality of scanning positions. Each of the robots has a robot arm on which a multi-color sensor 230 is mounted.

Figure 5A:
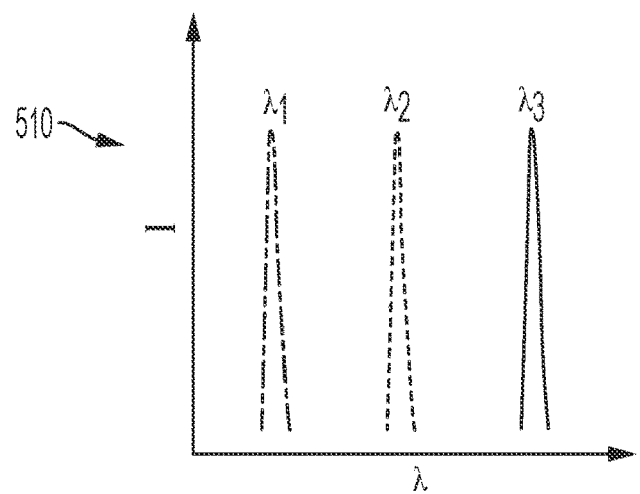
FIG. 5A shows a spectral intensity distribution diagram of wavelengths of the light emitted by the multi-wavelength LED array according to an exemplary embodiment of the invention.

FIG. 5A shows a spectral intensity distribution diagram 510 of wavelengths λ of the light emitted by the multi-wavelength LED array 220. As can be seen in FIG. 5A, each of the first, second, and third groups of the LEDs 422, 424, and 426 emits monochromatic light at respective wavelengths $\lambda_1$, $\lambda_2$ and $\lambda_3$ with very narrow bandwidths, wherein the maximum intensity I for all three wavelengths reaches approximately the same value and each intensity distribution for all three LEDs is essentially the same.

Figure 5B:
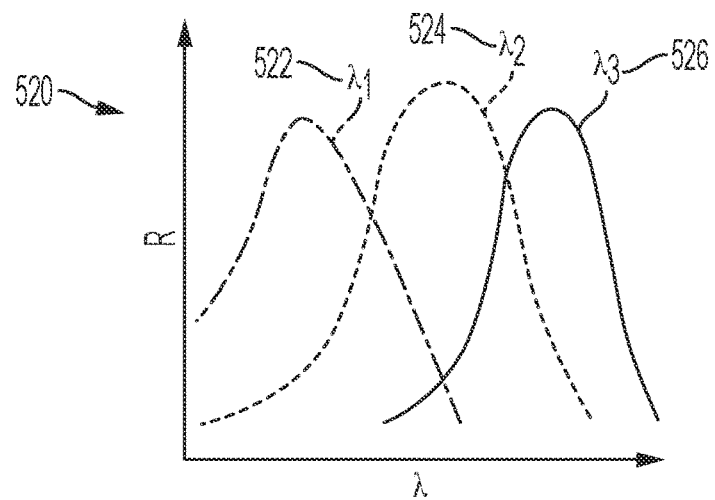
FIG. 5B shows a spectral intensity distribution diagram of the responsivity of a Bayer color camera to the light emitted by the multi-wavelength LED array.

FIG. 5B shows a spectral intensity distribution diagram 520 of the responsivity R of a Bayer color camera to the light emitted by the multi-wavelength LED array 220. Color filter arrays (CFA) for Bayer RGB sensors utilized in Bayer color cameras are typically made up of color dyes or pigments. Because of the nature of these materials, the spectral intensity distribution for red color 522 by LED 422 extends into green color 524 by LED 424 and blue color 526 by LED 526, the spectral intensity distribution for green color 526 extends into red and blue color, and the spectral distribution for blue color extends into green and red color. As shown in FIG. 5B, this results into heavy crosstalk when photons falling on one pixel are falsely sensed by pixels around it.

Figure 5C:
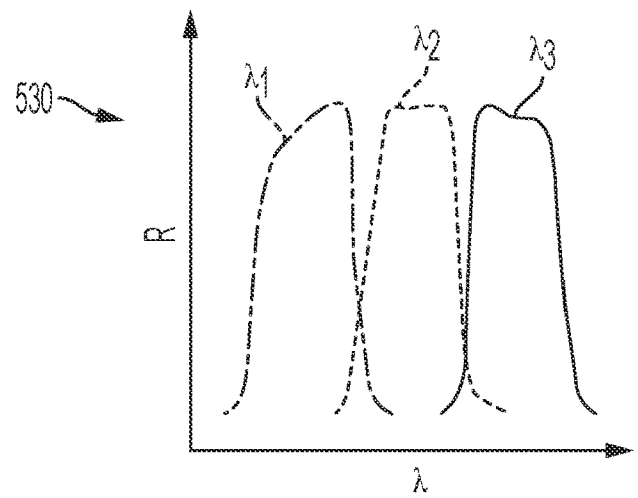
FIG. 5C shows a spectral intensity distribution diagram of the responsivity of a prism color camera to the light emitted by the multi-wavelength LED array.

FIG. 5C shows a spectral intensity distribution diagram 530 of the responsivity R of a prism color camera to the light emitted by the multi-wavelength LED array 220. Contrary to Bayer color cameras, prism color cameras have separate sensors for each color. Photons entering the prism color camera propagate through a prism before interacting with the sensors. As shown in FIG. 5C, the prism color camera offers better spectral differentiation than the Bayer color camera, which results in a very low color crosstalk between the wavelength regimes.

Figure 6A:
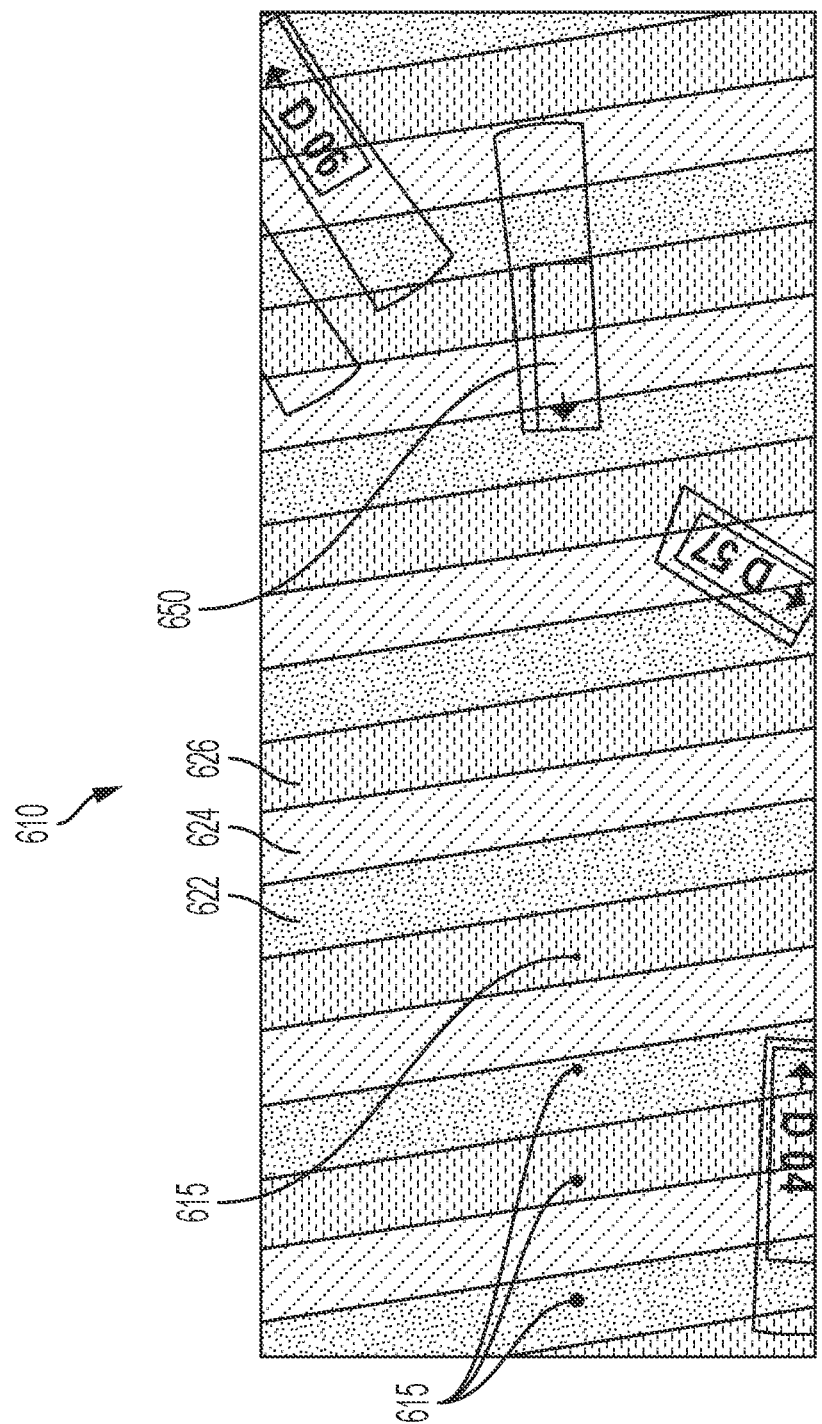
FIG. 6A shows a wavelength-multiplexed sensor image captured by a multi-color sensor.

FIG. 6A shows a wavelength-multiplexed sensor image 610 captured by the multi-color sensor in which three separate phase-shifted images 620, 630, and 640 are being displayed simultaneously, and the color sensor 230 captures all three phase-shifted images in a single acquisition. As shown in FIG. 6A, the simultaneously emitted spatial intensity color image patterns 492, 494, and 496 result in red color fringes 622, green color fringes 624, and blue color fringes 626 in the wavelength-multiplexed sensor image 610. The multi-color sensor 230 is configured to achieve sufficiently short exposure times in the order of 100 µs, and, as a result, the multi-color system 200 is rather insensitive to a poor positional repeatability of the multi-color sensor 230 and the multi-wavelength LED array 220 relative to the surface 210 to be inspected.

The wavelength-multiplexed sensor image shown in FIG. 6A is taken from the surface of a panel of an auto body which includes some defects 615 indicated by block marks, e.g., by block mark 650. From the wavelength-multiplexed sensor image shown in FIG. 6A, three separate spatial intensity color images shown in FIGS. 6B to 6D are generated.

Figure 6B:
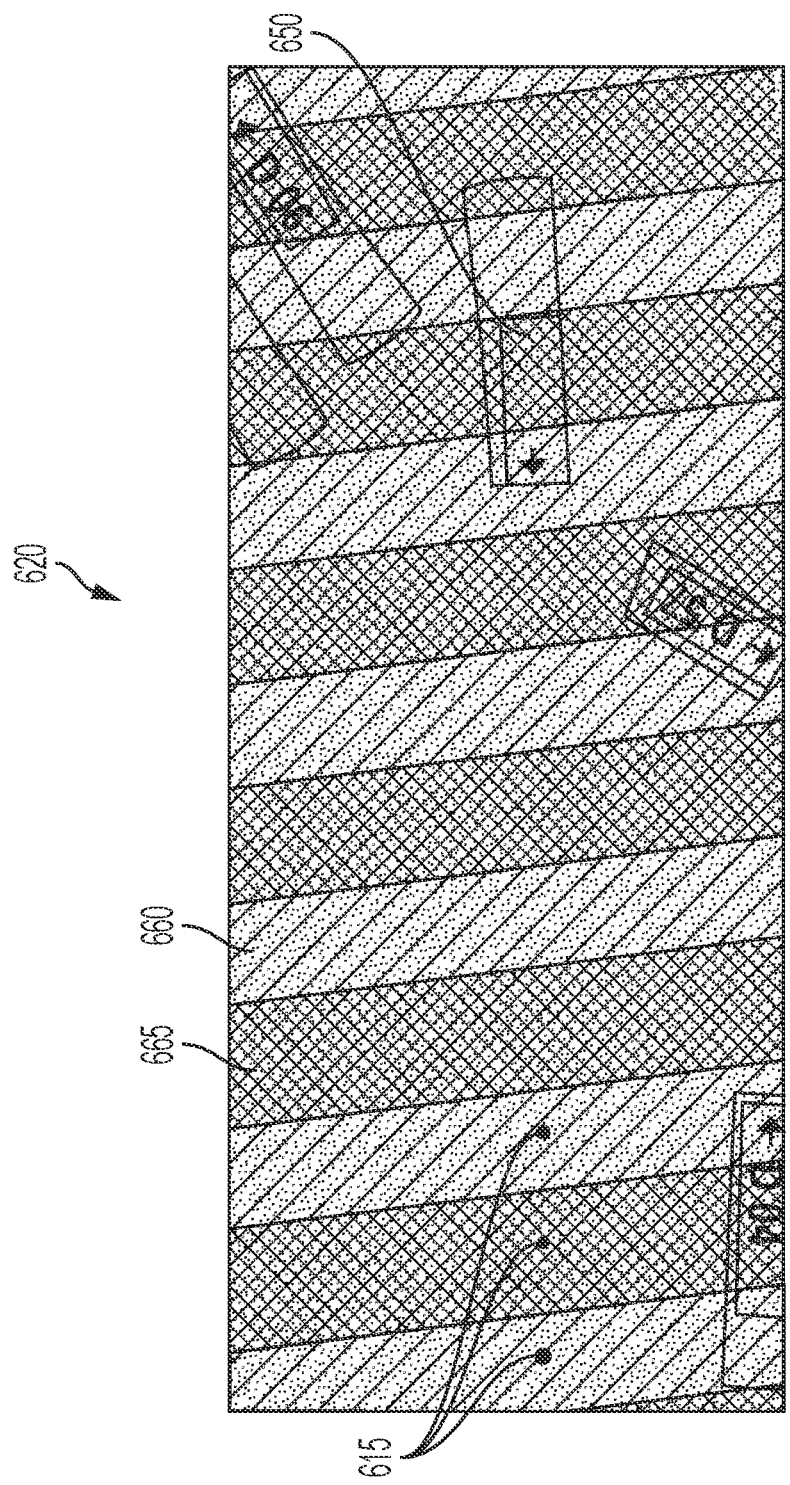
FIG. 6B shows a spatial intensity color image with a red wavelength regime generated from the wavelength-multiplexed sensor image shown in FIG. 6A.

FIG. 6B shows a spatial intensity color image 620 with a red wavelength regime generated from the wavelength-multiplexed sensor image shown in FIG. 6A. FIG. 6B shows three of the defects 615 in first and second areas 660 and 665, wherein the light intensity in the first areas 660 is higher than the light intensity in the second areas 665. FIG. 6C shows a spatial intensity color image 630 with a green wavelength regime generated from the wavelength-multiplexed sensor image shown in FIG. 6A. FIG. 6C shows six of the defects 615 in first and second areas 670 and 675, wherein the light intensity in the first areas 670 is higher than the light intensity in the second areas 675. FIG. 6D shows a spatial intensity color image 640 with a blue wavelength regime generated from the wavelength-multiplexed sensor image shown in FIG. 6A. FIG. 6D shows three of the defects 615 in first and second areas 680 and 685, wherein the light intensity in the first areas 680 is higher than the light intensity in the second areas 685.

Figure 6C:
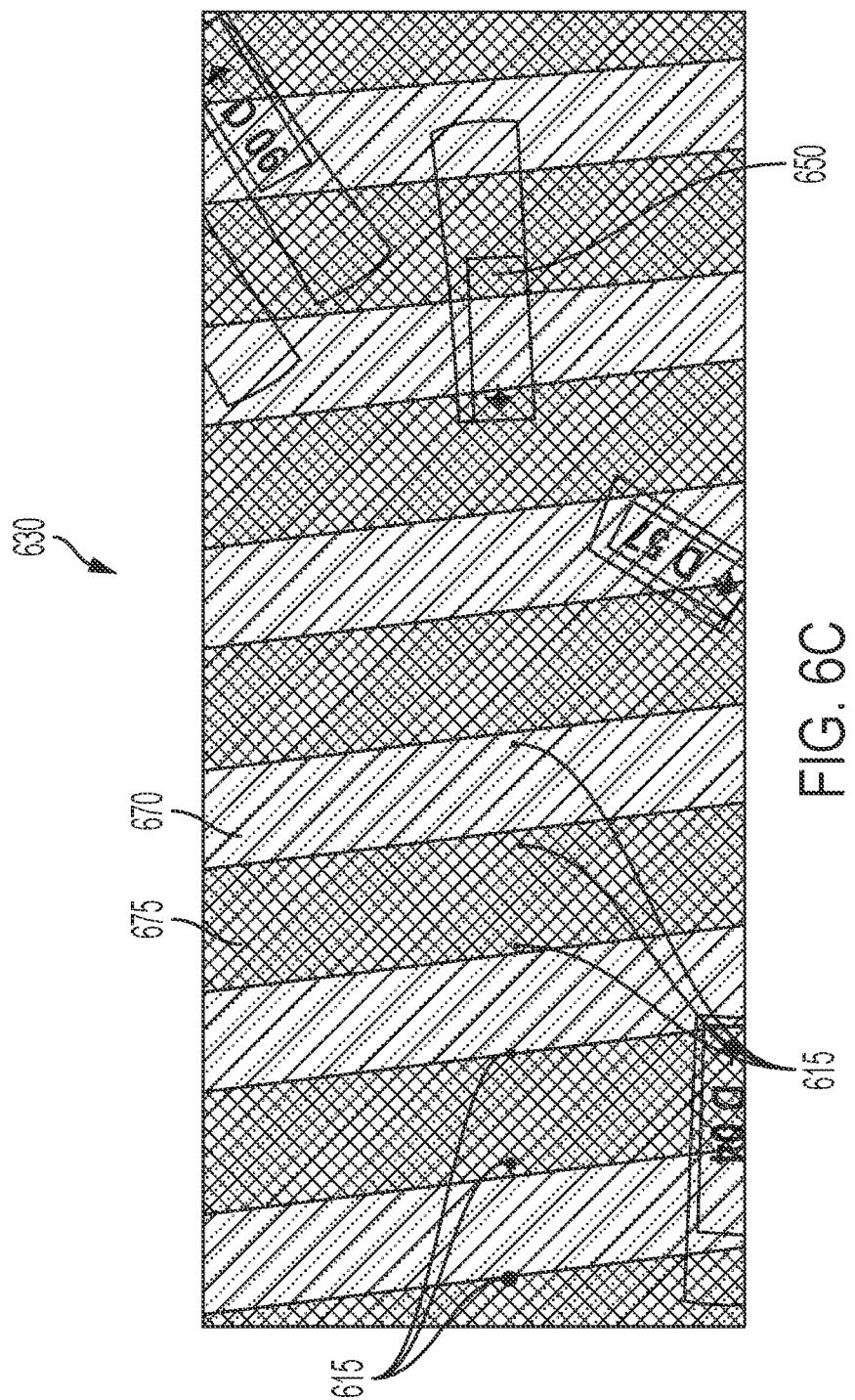
FIG. 6C shows a spatial intensity color image with a green wavelength regime generated from the wavelength-multiplexed sensor image shown in FIG. 6A.
Figure 6D:
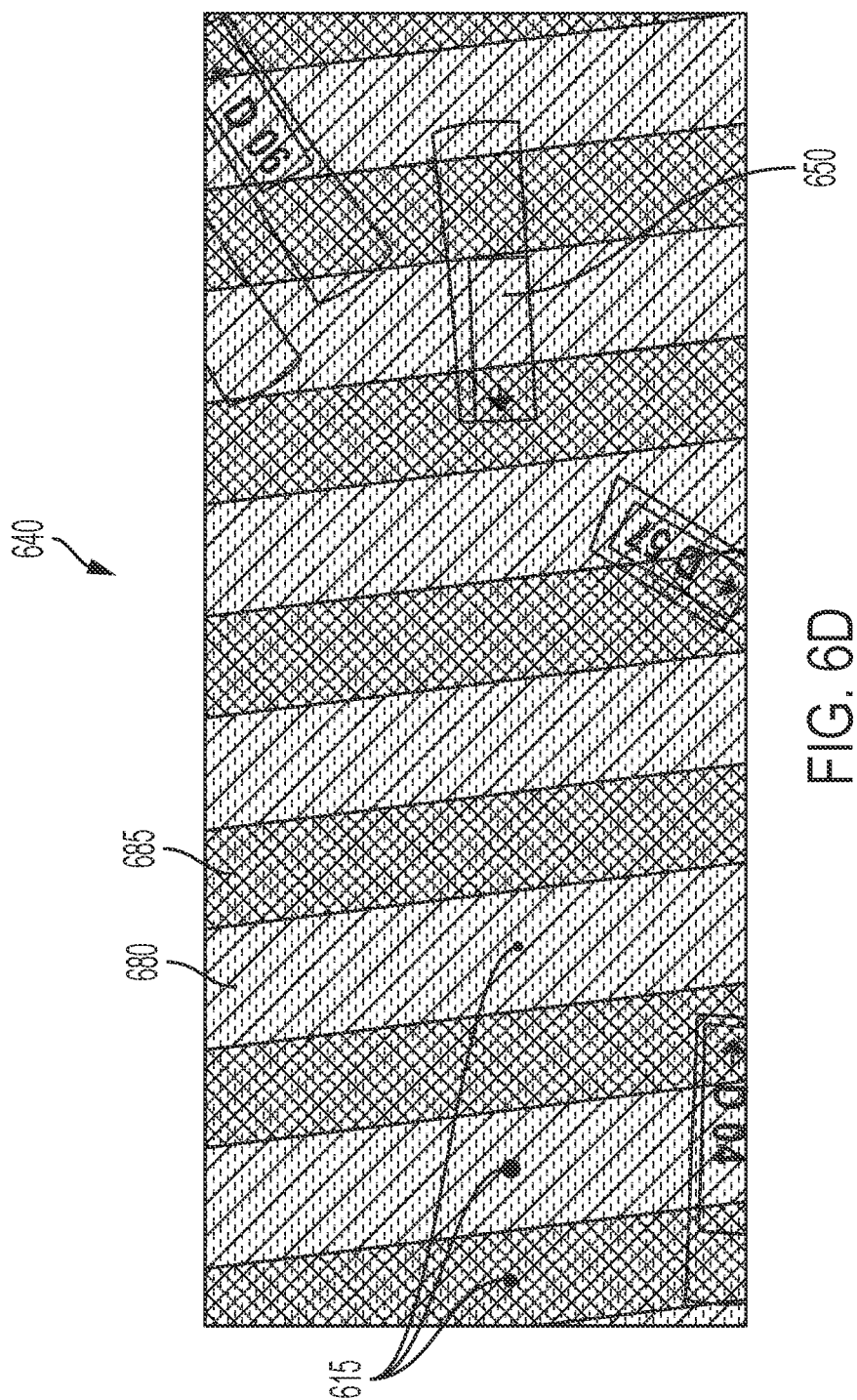
FIG. 6D shows a spatial intensity color image with a blue wavelength regime generated from the wavelength-multiplexed sensor image shown in FIG. 6A.

As can be seen in FIGS. 6B to 6D, the intensity profiles in the red, green, and blue wavelength regimes are phase-shifted and have sinusoidal patterns. Based on a phase-shift that is determined per pixel between the simultaneously emitted spatial intensity color image patterns 492, 494, and 496 in the spatial intensity color images 620, 630, and 640, changes in the slope of the surface 210 can be detected. From changes in the amplitudes of the spatial intensities per pixel, changes in the gloss, the roughness, the material, or the finish of the surface 210 can be detected.

Figure 7:
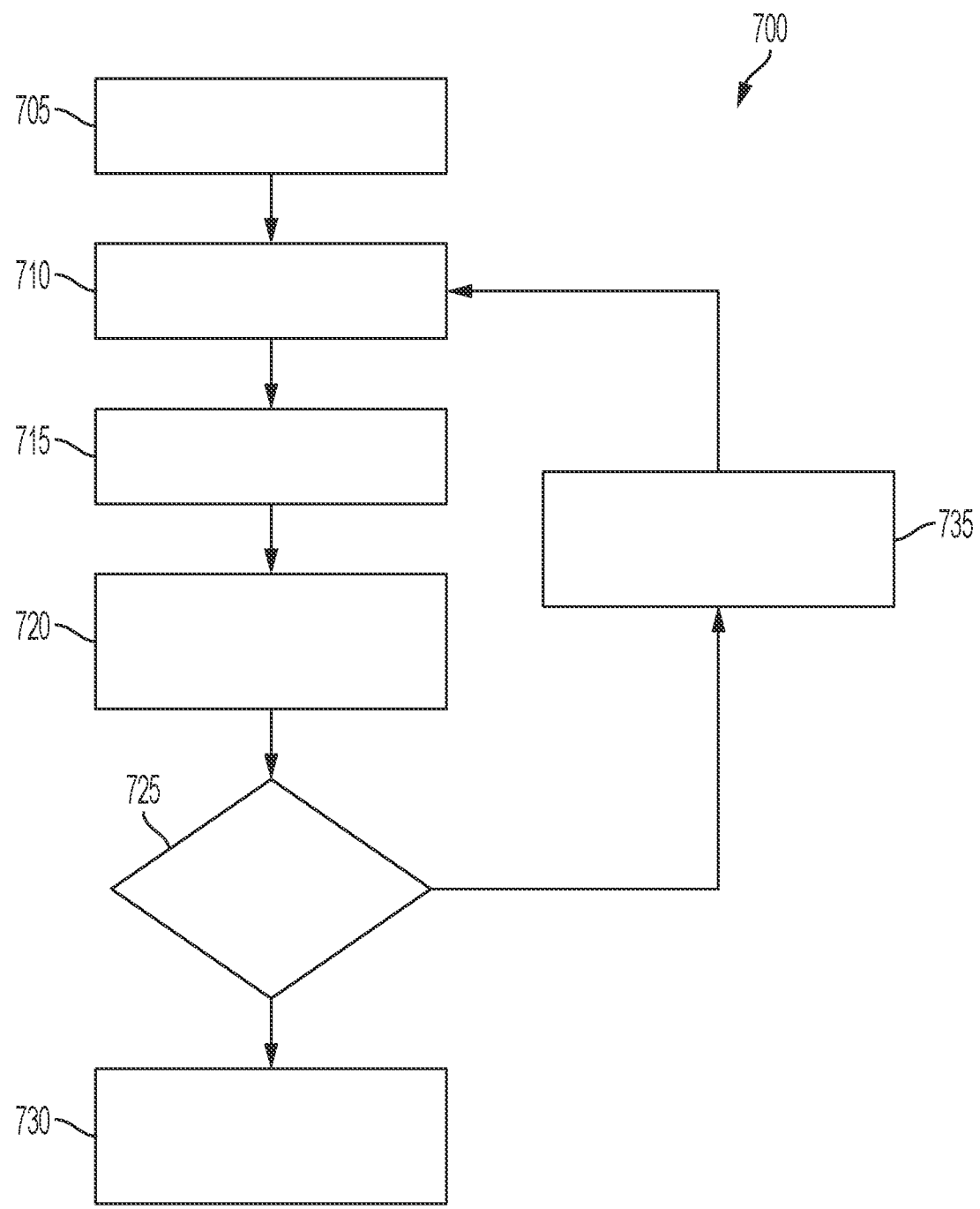
FIG. 7 shows a flow chart of a method for inspecting a surface of a specimen according to an exemplary embodiment of the invention.

FIG. 7 shows an illustration of a method 700 for inspecting a surface 210 of a specimen according to an exemplary embodiment of the invention. The method begins with step 705 in which a moving surface 210 to be inspected enters an inspection cell. It is also possible that both the multi-color sensor 230 and surface 210 of the specimen are moving relative to one another. The moving surface 210 can be the surface of a painted auto body which can have any color. In step 710, the moving surface 210 arrives at a scanning position where in step 715, a unique pattern is displayed in each wavelength regimes. The scanning position can be a position of a robot that performs certain tasks on the auto body, and on the robot arm of which multi-color sensor 230 is mounted. While the surface to be inspected is moving through the production line, a wavelength multiplexed camera image 610 is taken by multi-color sensor 230 in step 720. Depending on the size of the auto body, for example, a plurality of scanning positions may be defined at which single wavelength-multiplexed sensor images 610 are taken. In step 725, it is determined if all single wavelength-multiplexed sensor images 610 have been taken. If it is determined in step 725 that all single wavelength-multiplexed sensor images 610 have been taken, the method 700 proceeds to step 730 at which the moving surface 210 exits the inspection cell. If it is determined in step 725, that not all single wavelength-multiplexed sensor images 610 have been taken, the method 700 proceeds to step 735 in which the moving surface continues toward the next scanning position and the method continues with step 710.

Figure 8:
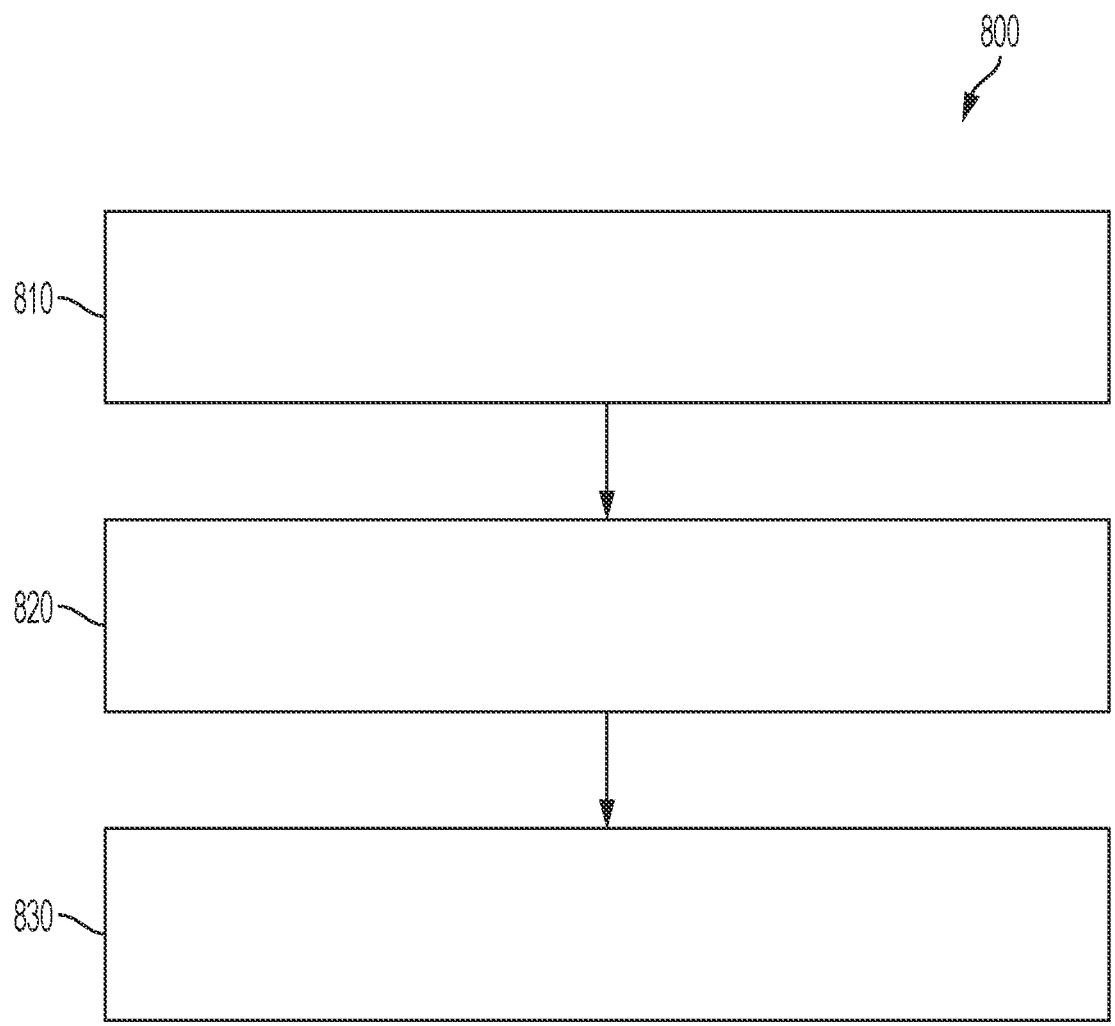
FIG. 8 shows another flow chart of the method for inspecting a surface of a specimen according to an exemplary embodiment of the invention.

FIG. 8 is a detailed illustration of the method 800 for multi-color inspection of a surface of a specimen at a scanning position. Method 800 begins at step 810 at which the surface 210 of a specimen is illuminated by multi-wavelength LED array 220 with a multi-color light pattern, the multi-color light pattern including simultaneously emitted spatial intensity color image patterns 492, 494, and 496. Each of the simultaneously emitted spatial intensity color image patterns 492, 494, and 496 includes first areas in which light is emitted with a first light intensity and second areas in which the light is emitted with a second light intensity. The first light intensity is higher than the second light intensity. Corresponding first and second areas in each of the simultaneously emitted spatial intensity color image patterns 492, 494, and 496 are phase-shifted relative to each other.

The method 800 continues to step 820 in which each of the simultaneously emitted spatial intensity color image patterns 492, 494, and 496 reflected from the surface 210 of the specimen are captured by multi-color sensor 230 in a single wavelength-multiplexed sensor image 610 at a scanning position.

In step 830, properties of the surface 210 are determined by data processing apparatus 240 based on an evaluation of the single wavelength-multiplexed sensor image 610.

When the multi-color system 200 is applied to the inspection of a painted auto body, one inherent difficulty is that painted auto bodies can be of any color. Thus, the reflectivity of the auto body across the multiple different wavelength regimes will vary significantly depending on the color of the auto body. In addition, as discussed above, currently available color cameras may have significant cross-talk, where information from one wavelength regime "bleeds" into the other two channels because the filters are not nearly 100% efficient.

To resolve these issues, a sensitive calibration of the multi-color system 200 that accounts for both complications is provided. The multi-color system 200 includes custom designed LED matrix boards on which specifically selected LEDs at three or more different colors may be mounted. Each board may contain, e.g., 1024 LEDs and multiple boards may be aligned together to create large illumination units. By controlling each color channel independently, the optical output intensity of each color can be reduced to compensate for both the differences in surface reflectivity and the quantum efficiency of the multi-color sensor 230. To alleviate crosstalk, numerous calibration images can be taken with the multi-wavelength LED array 220 illuminating at various intensities for each single color. In the case of three colors, for example, from this data, the relative mixing of the three-color channel intensities can be determined and a 3×3 transformation matrix can be calculated such that the three-color channels can be decomposed and are all of the same pixel intensity in the single wavelength-multiplexed sensor image 610.

Figure 9:
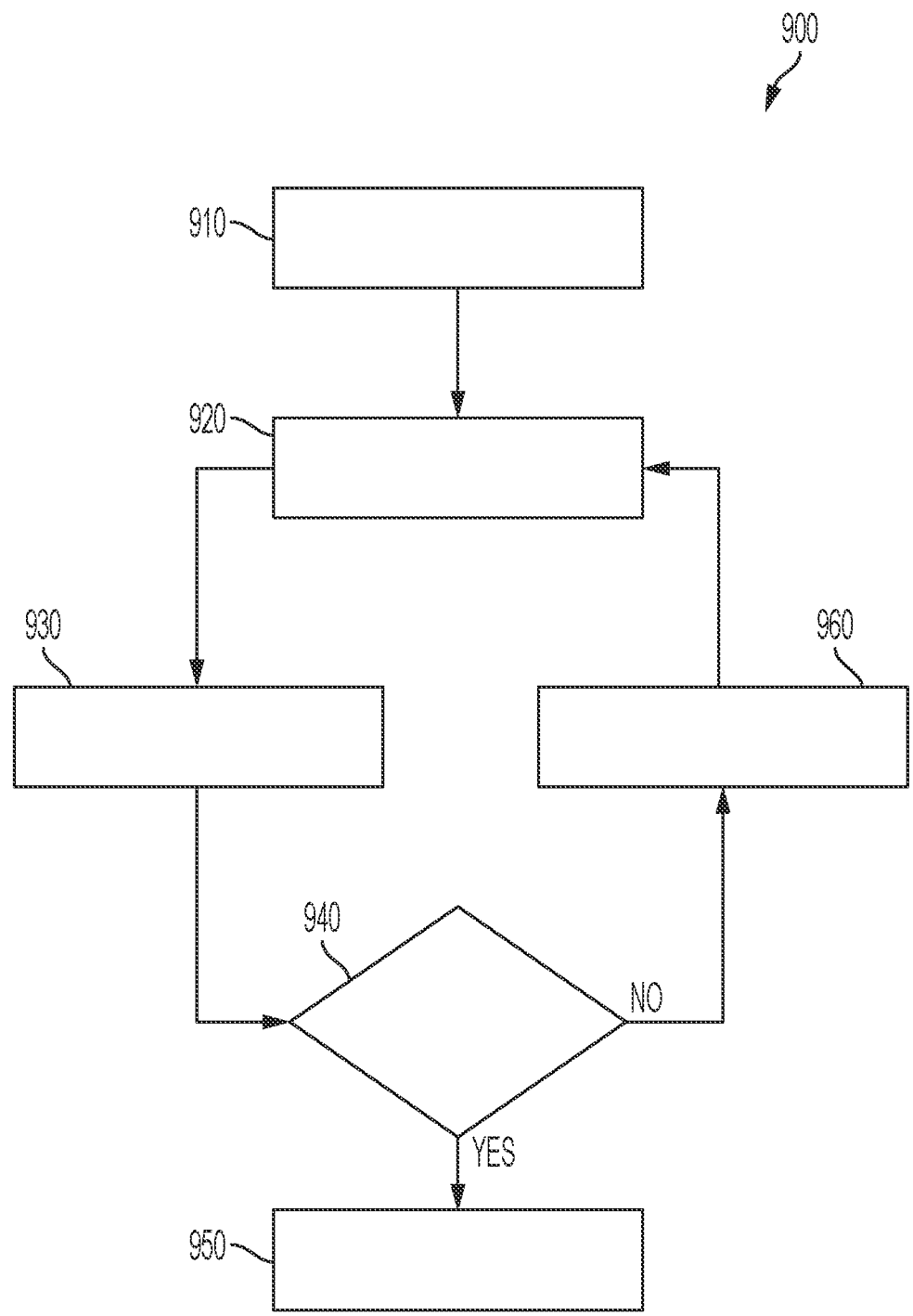
FIG. 9 shows a flow chart of a method for calibrating the multi-color system according to an exemplary embodiment of the invention.

FIG. 9 shows a flow chart of a method for calibrating the multi-color system according to an exemplary embodiment of the invention. At step 910 of method 900, the calibration starts. At step 920, an image is captured from a uniform LED intensity pattern reflected from the surface 210 which can have any color. At step 930, pixel intensities of each wavelength channel are analyzed. If it is determined in step 940 that all intensities reach the same intensity distribution, the method 900 continues to step 950 where it ends. If it is determined in step 940 that not all intensities reach the same intensity distribution, method 900 continues to step 960 at which individual channel power inputs are scaled. Then, the method 900 continues to repeat steps 920, 930, and 940.

Figure 10B:
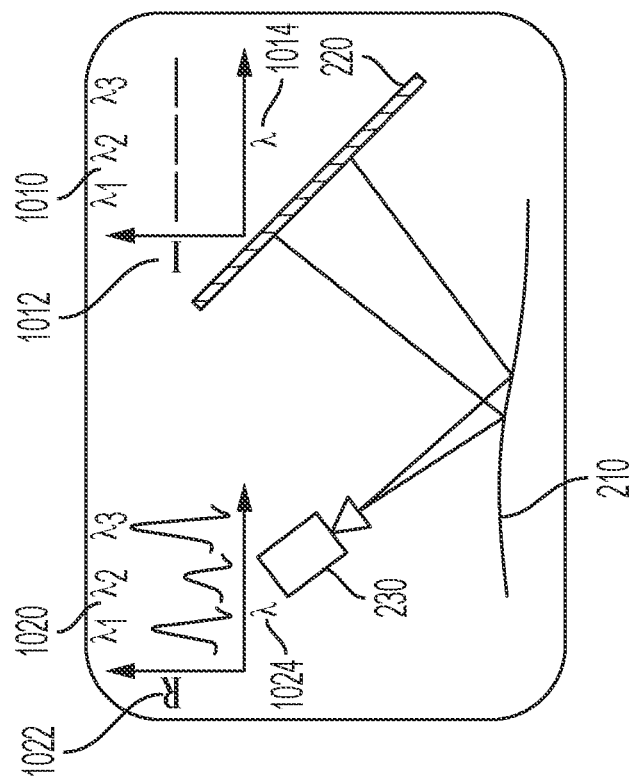
FIG. 10B shows spectral intensity distribution diagrams of the light emitted by the multi-wavelength LED array and of the responsivity of the multi-color sensor after calibration.
Figure 10A:
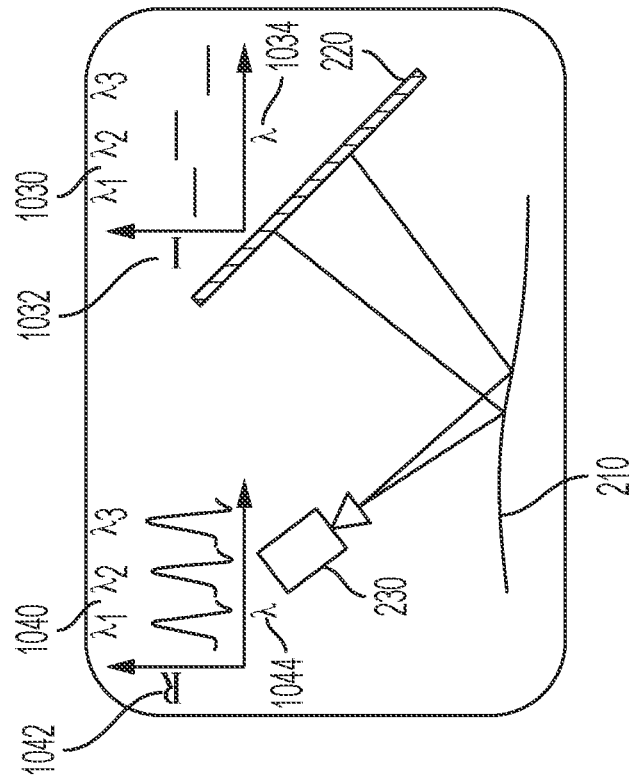
FIG. 10A shows spectral intensity distribution diagrams of the light emitted by the multi-wavelength LED array and of the responsivity of the multi-color sensor before calibration.

FIG. 10A shows a spectral intensity distribution diagram 1010 of wavelengths 1014 and intensities 1012 of the light emitted by the multi-wavelength LED array 220 and a spectral intensity distribution diagram 1020 of the responsivity 1022 of the multi-color sensor 230 before calibration over the wavelengths 1024. FIG. 10B shows a spectral intensity distribution diagram 1030 of wavelengths 1034 and intensities 1032 of the light emitted by the multi-wavelength LED array 220 and a spectral intensity distribution diagram 1040 of the responsivity 1042 of the multi-color sensor 230 after calibration over wavelengths 1044. As can be seen in FIG. 10A, surface 210 of the specimen (e.g., a surface of an auto body having a certain color) is illuminated by multi-wavelength LED array 220 with a uniform multi-color light pattern in which each of the simultaneously emitted color patterns has a same light intensity. Because of the specific color of the surface 210, each of the simultaneously emitted color patterns is reflected differently resulting in a different intensity distribution 1020 for each wavelength channel. FIG. 10B further shows an adjusted multi-color light pattern, which, when reflected from the surface 210, results in a calibration sensor image in which the light intensity distribution 1040 for each color channel are essentially the same.

Figure 11:
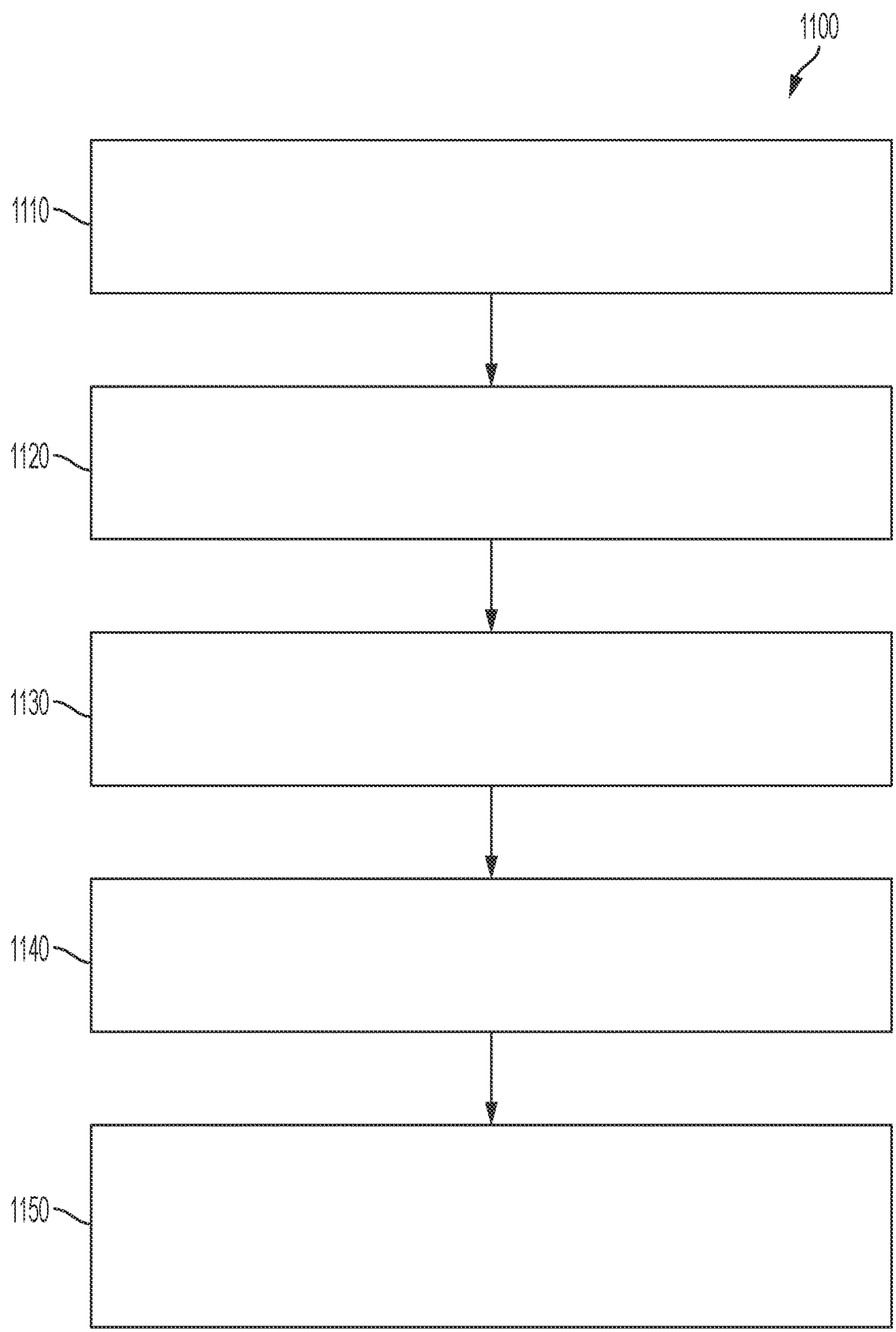
FIG. 11 shows another flow chart of the method for calibrating the multi-color system according to an exemplary embodiment of the invention.

FIG. 11 shows another flow chart of the method 1100 for calibrating the multi-color system 200. The method begins at step 1110 at which the surface 210 of the specimen is illuminated with a uniform multi-color light pattern. The uniform multi-color light pattern includes the simultaneously emitted spatial intensity color image patterns, and corresponding areas of each of the simultaneously emitted spatial intensity color image patterns have a same light intensity. The method 1100 continues to step 1120 at which each of the simultaneously emitted uniform image patterns reflected from the surface of the specimen are captured by the multi-color sensor in a single calibration sensor image at a calibration scanning position. At step 1130, the single calibration sensor image is subdivided into pixels. At step 1140, it is determined whether light intensities of corresponding pixels of each wavelength channel in the single calibration sensor image reach the same intensity distribution. At step 1150, upon determining that the light intensities of the corresponding pixels of the wavelength channels in the single calibration sensor image reach a different intensity distribution, the light intensities of the corresponding areas of each of the simultaneously emitted spatial intensity color image patterns are adjusted to permit the light intensities of corresponding pixels of each wavelength channel in the single calibration sensor image reach the same intensity distribution.

In summary, a multi-color surface inspection system, a method for multi-color inspection, and a method for calibrating the multi-color surface inspection system are provided which significantly improve existing white sensor techniques based on phase-shifted deflectometry. The system utilizes a multi-wavelength LED array 220 in which each color LED is controlled individually. Generating the light from LEDs with a narrower emission bandwidth reduces cross-talk between the wavelength regimes and yields better signal-to-noise ratios in post-calculated images. The surfaces 210 to be inspected are color sensitive so that the reflectivity varies significantly across the multiple wavelength regimes. This requires calibration of the output intensity of the multi-wavelength LED array between the different colors to obtain optimal depth and gloss sensitivity.

The term "comprising" (and its grammatical variations) as used herein is used in the inclusive meaning of "having" or "including" and not in the exclusive sense of "consisting only of." The terms "a" and "the" as used herein are understood to encompass the plural as well as the singular.

It is understood that the foregoing description is that of the exemplary embodiments of the invention and that various changes and modifications may be made thereto without departing from the spirit and scope of the invention as defined in the appended claims.

What is claimed is:

1. A multi-color system for optically inspecting a surface of a specimen, the system comprising:
    a multi-wavelength light-emitting diode (LED) array including a plurality of LEDs, each of the plurality of LEDs emitting monochromatic light, the multi-wavelength LED array being configured to illuminate the specimen with a multi-color light pattern, the multi-color light pattern including simultaneously emitted spatial intensity color image patterns, each of the simultaneously emitted spatial intensity color image patterns including first areas in which light is emitted with a first light intensity and second areas in which the light is emitted with a second light intensity, the first light intensity being higher than the second light intensity, and corresponding first and second areas in each of the simultaneously emitted spatial intensity color image patterns being phase-shifted relative to each other;
    a multi-color sensor configured to capture each of the simultaneously emitted spatial intensity color image patterns reflected from the surface of the specimen in a single wavelength-multiplexed sensor image at a scanning position;
    a data processing apparatus in communication with the multi-color sensor and configured to determine properties of the surface based on an evaluation of the single wavelength-multiplexed sensor image;
    an LED board on which the plurality of LEDs forming the multi-wavelength led array is arranged; and
    an LED driver in communication with the multi-wavelength LED array, the multi-wavelength led array including a plurality of LEDs, the plurality of LEDs being arranged in groups of LEDs, and each of the groups of LEDs being controlled by the LED driver to generate one of the simultaneously emitted spatial intensity color image patterns, wherein a first group of LEDs has a red wavelength regime, a second group of LEDs has a green wavelength regime, and a third group of LEDs has a blue wavelength regime, wherein the first, second, and third groups of LEDs are arranged on the LED board in a Bayer pattern.

2. The multi-color system of claim 1, wherein the multi-color sensor is configured to capture the single wavelength-multiplexed sensor image as the specimen is moving.

3. The multi-color system of claim 1, wherein the multi-color sensor is a multi-sensor prism color camera.

4. The multi-color system of claim 1, further comprising a robot arranged at the scanning position, the robot having a robot arm, and the multi-color sensor being mounted on the robot arm.

5. The multi-color system of claim 1, wherein:
    each of the simultaneously emitted spatial intensity color image patterns has a different wavelength regime and forms a wavelength channel, and
    bandwidths of the wavelength channels do not overlap.

6. The multi-color system of claim 5, wherein each of the simultaneously emitted spatial intensity color image patterns is a sinusoidal color light intensity pattern.

7. The multi-color system of claim 1, further comprising:
    a heat sink arranged on one side of the LED board; and
    an optical diffuser arranged on another side of the LED board,
    wherein the LED driver is configured to control each of the groups of LEDs from among the plurality of LEDs individually.

8. The multi-color system of claim 1, wherein the LED driver is a field-programmable gate array (FPGA).

9. A method for multi-color inspection of a surface of a specimen, the method comprising:
    illuminating the specimen with a multi-color light pattern with a multi-wavelength light-emitting diode (LED) array including a plurality of LEDs, each of the plurality of LEDs emitting monochromatic light, the multi-color light pattern including simultaneously emitted spatial intensity color image patterns, each of the simultaneously emitted spatial intensity color image patterns including first areas in which light is emitted with a first light intensity and second areas in which the light is emitted with a second light intensity, the first light intensity being higher than the second light intensity, and corresponding first and second areas in each of the simultaneously emitted spatial intensity color image patterns being phase-shifted relative to each other, wherein the multi-wavelength LED array includes a plurality of LEDs;
    capturing each of the simultaneously emitted spatial intensity color image patterns reflected from the surface of the specimen in a single wavelength-multiplexed sensor image at a scanning position;
    determining properties of the surface based on an evaluation of the single wavelength-multiplexed sensor image;
    controlling each of the LEDs from among the plurality of LEDs individually;
    arranging the plurality of LEDs in groups of LEDs;
    controlling each of the groups of LEDs to generate one of the simultaneously emitted spatial intensity color image patterns; and arranging a first group of LEDs, a second group of LEDs, and a third group of LEDs on an LED board, the first group of LEDs having a red wavelength regime, the second group of LEDs having a green wavelength regime, and the third group of LEDs having a blue wavelength regime, wherein the first group of LEDs, the second group of LEDs, and the third group of LEDs are arranged on the LED board in a Bayer pattern.

10. The method of claim 9, further comprising:
capturing the single wavelength-multiplexed sensor image as the specimen is moving.

11. The method of claim 9, wherein:
each of the simultaneously emitted spatial intensity color image patterns has a different wavelength regime and forms a wavelength channel, and
bandwidths of the wavelength channels do not overlap.

12. The method of claim 11, wherein each of the simultaneously emitted spatial intensity color image patterns is a sinusoidal color light intensity pattern.

13. The method of claim 9, wherein:
the specimen is illuminated by a multi-wavelength LED array,
the simultaneously emitted spatial intensity color image patterns reflected from the surface of the specimen are captured by a multi-color sensor, and
the multi-color sensor is a multi-color prism color camera.

14. The method of claim 9, wherein the multi-color sensor is mounted on a robot arm of a robot arranged at the scanning position.

15. The method of claim 9, wherein the scanning position is a first scanning position, and wherein the method further comprises:
defining an inspection cell, the inspection cell including a start position, the first scanning position, at least one second scanning position, and an end position;
moving the specimen from the start position to the first scanning position, from the first scanning position to the at least one second scanning position, and from the at least one second scanning position to the end position; and
capturing single images of the light intensity pattern reflected from the surface of the specimen at each of the first and at least one second scanning positions.

* * * * *